Jan. 3, 1928. 1,655,353
U. BAREI
VEHICLE
Filed Nov. 11, 1924
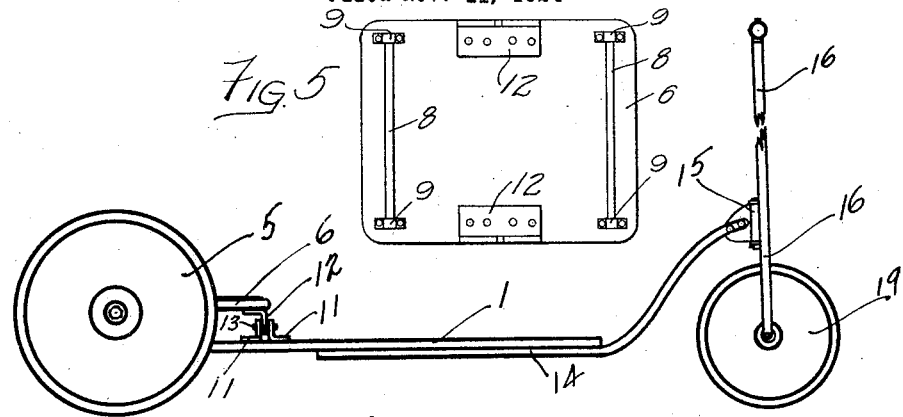
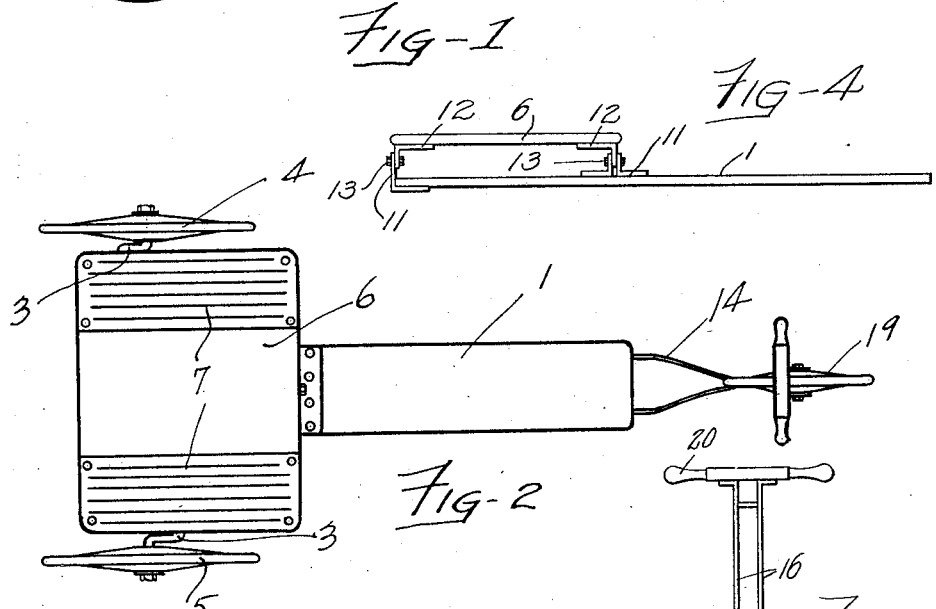
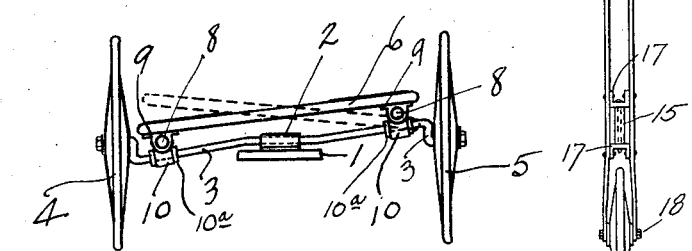
INVENTOR
UMBERTO BAREI
BY
ATTORNEY Patented Jan. 3, 1928.

1,655,353

UNITED STATES PATENT OFFICE.

UMBERTO BAREI, OF RENTON, WASHINGTON.

VEHICLE.

Application filed November 11, 1924. Serial No. 749,312.

This invention relates to improvements in vehicles and more particularly to the three wheeled type of coaster used by children.

It has for its principal object to provide a device of this character which is very easily propelled by the operator who rocks from side to side in a standing position.

Another object is the provision of a device of this character which is of simple, efficient, durable, and inexpensive construction, and wherein the several parts are readily accessible.

These and other objects will appear as my invention is more fully hereinafter described, illustrated in the accompanying drawings, and finally pointed out in the appended claim.

In the drawings

Figure 1 is a side elevation of my improved device.

Fig. 2 is a plan view of Fig. 1.

Fig. 3 is a rear elevation of Fig. 2 with parts omitted for convenience in illustrating.

Fig. 4 is a detailed side elevation of a movable platform mounted on the main body of the vehicle.

Fig. 5 is a bottom plan view of the movable platform.

Fig. 6 is a front elevation of the steering mechanism of the device.

Referring now more particularly to the drawings, reference numeral 1 indicates the main body of the device, the rear end of which is provided with a bearing 2, which rotatably supports an axle 3, the wheel 4 being fixed to the axle, and the wheel 5 being rotatably mounted on the axle, thus forming a differential feature by allowing one wheel to revolve independently of the other. 6 indicates a platform upon which the operator stands to operate the device. 7 indicates a pair of rubber foot-pads mounted to the platform 6. The under side of the platform 6 is provided with a pair of metallic strips, rods, or the like, indicated at 8, and secured in place by brackets indicated at 9. The rods 8 are adapted to co-act with a pair of roller bearings indicated at 10, which are mounted on the axle 3, as shown in Fig. 3, in any approved manner, such for instance, as by collars $10^a$. Mounted on the upper side of the main body is a pair of brackets indicated at 11, adapted to pivotally support a pair of brackets indicated at 12, which are depending from and secured to the platform 6. 13 indicates a pair of bolts which form the pivotal connection for both brackets. The under side of the main body 1 is provided with a bifurcated support, indicated at 14, which terminates in a steering yoke, indicated at 15, which is embraced within a pair of upwardly extending members 16, by means of U shaped brackets indicated at 17. The lowermost ends of the upright members 16, embrace the axle 18 of the front, or steering wheel 19, of the vehicle, by means of nuts indicated at 18. The uppermost end of the upright members 16 is provided with a handle 20, for convenience in steering, which is held in place by counter-sunk wood screws, not shown in the drawings.

While I have shown a particular form of embodiment of my invention, I am aware that many minor changes therein will readily suggest themselves to others skilled in the art, without departing from the spirit and scope of my invention. Therefore I do not desire to be limited to the exact form shown.

Having described my invention, what I claim as new and desire to protect by Letters Patent is:

In an article of the class described, the combination of a main body member, a steering wheel, mounted to one of its ends, a pair of rear wheels, mounted to its opposite end on an eccentric axle, a platform pivotally mounted on the main body and adapted to co-act with the said eccentric axle by foot pressure from the operator.

In testimony whereof I affix my signature.

UMBERTO BAREI.